(12) United States Patent
Luo et al.

(10) Patent No.: US 12,511,158 B2
(45) Date of Patent: Dec. 30, 2025

(54) TASK ALLOCATION METHOD, APPARATUS, ELECTRONIC DEVICE AND COMPUTER-READABLE STORAGE MEDIUM

(71) Applicant: Stream Computing Inc., Beijing (CN)

(72) Inventors: Fei Luo, Beijing (CN); Weiwei Wang, Beijing (CN)

(73) Assignee: Stream Computing Inc., Beijing (CN)

( * ) Notice: Subject to any disclaimer, the term of this patent is extended or adjusted under 35 U.S.C. 154(b) by 620 days.

(21) Appl. No.: 17/929,947

(22) Filed: Sep. 6, 2022

(65) Prior Publication Data

US 2023/0004429 A1 Jan. 5, 2023

Related U.S. Application Data

(63) Continuation of application No. PCT/CN2020/079373, filed on Mar. 13, 2020.

(51) Int. Cl.
*G06F 9/48* (2006.01)
*G06F 9/52* (2006.01)

(52) U.S. Cl.
CPC .............. *G06F 9/4881* (2013.01); *G06F 9/52* (2013.01)

(58) Field of Classification Search
CPC ................................ G06F 9/4881; G06F 9/52
USPC ......................................................... 718/102
See application file for complete search history.

(56) References Cited

U.S. PATENT DOCUMENTS 10,725,837 B1 * 7/2020 Dash ...................... G06F 9/4843
10,754,701 B1 * 8/2020 Wagner ................. G06F 9/5077
11,061,910 B1 * 7/2021 Kondiles ........... G06F 16/24568
2004/0239677 A1 * 12/2004 Mutanen ................... G06F 3/14
345/545
2010/0115525 A1 5/2010 Loucks
(Continued)

FOREIGN PATENT DOCUMENTS

CN 1952900 A 4/2007
CN 101165655 A 4/2008
(Continued)

OTHER PUBLICATIONS

International Search Report for PCT Application No. PCT/CN2020/079373, mailed Dec. 11, 2020.
(Continued)

*Primary Examiner* — Hiren P Patel
*Assistant Examiner* — Ross Michael Vincent
(74) *Attorney, Agent, or Firm* — IPro, PLLC

(57) ABSTRACT

Disclosed is a task allocation method, apparatus, electronic device, and computer-readable storage medium. The task allocation method includes: in response to receiving a synchronization signal, determining, by the microprocessor, whether allocation of a task segment to the processing core is required according to the synchronization signal, wherein the task segment is a part of a task; in response to the allocation of the task segment to the processing core being required, instructing, by the microprocessor, to allocate the task segment to the processing core; receiving, by the processing core, the task segment; and in response to satisfying a first preset condition, sending, by the processing core, a synchronization request signal, wherein the synchronization request signal is configured to trigger the generation of the synchronization signal.

10 Claims, 7 Drawing Sheets

(56) References Cited

U.S. PATENT DOCUMENTS

| | | | | |
|---|---|---|---|---|
| 2012/0110303 | A1* | 5/2012 | Dhanwada | G06F 15/17325 |
| | | | | 712/31 |
| 2017/0102971 | A1* | 4/2017 | Blagodurov | G06F 9/5038 |
| 2019/0121679 | A1 | 4/2019 | Wilkinson et al. | |
| 2019/0138373 | A1* | 5/2019 | Nicol | G06F 15/7871 |
| 2019/0340722 | A1 | 11/2019 | Aas et al. | |
| 2021/0004788 | A1* | 1/2021 | Kim | G06Q 20/32 |

FOREIGN PATENT DOCUMENTS

| | | | | | |
|---|---|---|---|---|---|
| CN | 102446155 | A | | 5/2012 | |
| CN | 104462006 | A | | 3/2015 | |
| CN | 108984464 | A | | 12/2018 | |
| CN | 113360186 | A | * | 9/2021 | G06F 9/3836 |
| CN | 112416053 | B | * | 11/2023 | G06F 1/12 |
| EP | 0473452 | A2 | * | 3/1992 | G06F 9/52 |

OTHER PUBLICATIONS

Extended European Search Report for European Patent Application No. EP20924667.7, dated Apr. 11, 2023.

* cited by examiner

TASK ALLOCATION METHOD, APPARATUS, ELECTRONIC DEVICE AND COMPUTER-READABLE STORAGE MEDIUM

CROSS-REFERENCE TO RELATED APPLICATION

This application is a continuation application of International Patent Application No. PCT/CN2020/079373, filed on Mar. 13, 2020, the entire contents of which are incorporated herein by reference for all purposes.

TECHNICAL FIELD

The disclosure relates to the field of processors, and in particular, to a task allocation method, apparatus, electronic device, and computer-readable storage medium.

BACKGROUND

With the development of science and technology, human society is rapidly entering an era of intelligence. The important feature of the era of intelligence is that people may acquire more and more types of data, the amount of data that people may acquire is becoming larger and larger, and the demand for the data processing speed is becoming higher and higher. Chips are the cornerstone of task allocation, which essentially determine the ability to process data. From the perspective of application fields, the chips are mainly developed in two routes. One is general-purpose chips, for example, CPU and the like, which can provide great flexibility but have low effective computing power when processing algorithms in a specific field; the other is special-purpose chips, for example, TPU and the like, which have high effective computing power in certain specific fields but are poor in processing capacity or even have no processing capacity in flexible and universal fields. Due to various data types and numerous data volumes in the era of intelligence, the chips are required to not only process changing algorithms in different fields with extremely high flexibility, but also rapidly process a great number of dramatically increasing data volumes with extremely strong processing capacities.

In neural network computing, multi-core or many-core chips are often used. How to efficiently exploit the computing power of the many processing cores is the key to determining the performance of the entire chip. The utilization of computing power of each processing core depends on a variety of factors, such as task scheduling and allocation, chip architecture, processing core structure, and processing core circuitry. Among them, task scheduling and allocation is a very critical factor. If the scheduling and allocation of tasks are reasonable, the effective computing power of each processing core can be fully utilized.

SUMMARY

The summary is provided to introduce concepts in a brief form, which will be described in detail in the Detailed Description that follows. The summary is not intended to identify key features or essential features of the claimed technical solution, nor is it intended to be used to limit the scope of the claimed technical solution.

The embodiments of the present disclosure provide the following technical solutions.

In a first aspect, the embodiments of the present disclosure provide a task allocation method, including:
  in response to receiving a synchronization signal, determining, by the microprocessor, whether allocation of a task segment to the processing core is required according to the synchronization signal, wherein the task segment is a part of a task;
  in response to the allocation of the task segment to the processing core being required, instructing, by the microprocessor, to allocate the task segment to the processing core;
  receiving, by the processing core, the task segment; and
  in response to satisfying a first preset condition, sending, by the processing core, a synchronization request signal, wherein the synchronization request signal is configured to trigger the generation of the synchronization signal.

Further, in response to receiving the synchronization signal, determining, by the microprocessor, whether the allocation of the task segment to the processing core is required according to the synchronization signal, includes:
  executing, by the microprocessor, its own program; and
  in response to receiving the synchronization signal, determining, by the microprocessor, the processing core that requires to be allocated the task segment according to the number of the synchronization signals received.

Further, the first preset condition includes: the processing core has received the task segment or executing time taken by the processing core to receive the task segment reaches a preset time threshold.

Further, instructing, by the microprocessor, to allocate the task segment to the processing core, includes:
  instructing, by the microprocessor, a memory controller to read the task segment from an external memory and send it to the processing core.

Further, instructing, by the microprocessor, the memory controller to read the task segment from the external memory and send it to the processing core, includes:
  obtaining, by the microprocessor, size of storage space of the processing core;
  instructing, by the microprocessor, the memory controller to read the task segment that matches the size of the storage space of the processing core from the memory and send it to the processing core.

Further, the method further includes:
  in response to the allocation of the task segment to the processing core not being required, executing, by the microprocessor, its own program;
  executing, by the processing core, a last received task segment; and
  in response to satisfying a second preset condition, sending, by the processing core, the synchronization request signal.

Further, the second preset condition includes: the processing core executes a synchronization request signal sending instruction in the last received task segment, or time taken by the processing core to execute the last received task segment reaches a preset time threshold.

Further, the chip includes at least two processing cores executing the task, and the microprocessor instructs to allocate task segments to the at least two processing cores, respectively.

Further, the synchronization request signal includes the synchronization request signals generated by the at least two processing cores executing the task.

Further, sending, by the processing core, the synchronization request signal, wherein the synchronization request signal is configured to trigger the generation of the synchronization signal, includes:

in response to each of the processing cores executing the task having sent the synchronization request signal, triggering the generation of the synchronization signal.

Further, the microprocessor includes a counter, and after receiving the synchronization signal, the method further includes:

starting the counter to record the number of the synchronization signals received by the microprocessor.

Further, the synchronization signal is generated by a synchronization signal generator, wherein the synchronization signal generator is realized by hardware or software.

In a second aspect, the embodiments of the present disclosure provide a chip, including:

a processing core, configured to execute a task;

a microprocessor, configured to, in response to receiving a synchronization signal, determine whether allocation of a task segment to the processing core is required according to the synchronization signal, wherein the task segment is a part of the task; and configured to, in response to the allocation of the task segment to the processing core being required, instruct to allocate the task segment to the processing core; and a memory controller, configured to, based on an instruction from the microprocessor, read the task segment corresponding to the instruction from an external memory and send it to the processing core.

Further, the processing core is further configured to: receive the task segment; and in response to satisfying a first preset condition, send a synchronization request signal, wherein the synchronization request signal is configured to trigger the generation of the synchronization signal.

Further, the microprocessor is further configured to: execute its own program; and in response to receiving the synchronization signal, determine the processing core that requires to be allocated the task segment according to the number of the synchronization signals received.

Further, the first preset condition includes: the processing core has received the task segment or the executing time taken by the processing core to receive the task segment reaches a preset time threshold.

Further, the microprocessor is further configured to instruct the memory controller to read the task segment from the external memory and send it to the processing core.

Further, the microprocessor is further configured to obtain size of storage space of the processing core; and instruct the memory controller to read the task segment that matches the size of the storage space of the processing core from the memory and send it to the processing core.

Further, the microprocessor is further configured to in response to the allocation of the task segment to the processing core not being required, execute its own program; and the processing core is further configured to execute a last received task segment; and in response to satisfying a second preset condition, send the synchronization request signal.

Further, the second preset condition includes: the processing core executes a synchronization request signal sending instruction in the last received task segment, or the time taken by the processing core to execute the last received task segment reaches a preset time threshold.

Further, the chip includes at least two processing cores executing the task, and the microprocessor is configured to instruct to allocate task segments to the at least two processing cores, respectively.

Further, the synchronization request signal includes the synchronization request signals generated by the at least two processing cores executing the task.

Further, the microprocessor includes a counter, and after receiving the synchronization signal, the microprocessor is further configured to start the counter to record the number of the synchronization signals received by the microprocessor.

In a third aspect, the embodiments of the present disclosure provide an electronic device, including: a memory for storing computer-readable instructions; and one or more processors for executing the computer-readable instructions, which, upon execution, cause the processors to implement any one of the task allocation methods in the first aspect.

In a fourth aspect, the embodiments of the present disclosure provide a non-transitory computer-readable storage medium, the non-transitory computer-readable storage medium storing computer instructions for causing a computer to execute any one of the task allocation methods in the first aspect.

In a fifth aspect, the embodiments of the present disclosure provide a computer program product, comprising computer instructions, wherein, when the computer instructions are executed by a computing device, the computing device executes any one of the task allocation methods in the first aspect.

In a sixth aspect, the embodiments of the present disclosure provide a computing apparatus, comprising one or more chips in the second aspect.

The embodiments of the present disclosure provide a task allocation method, apparatus, electronic device and computer-readable storage medium. The task allocation method includes: in response to receiving a synchronization signal, determining, by the microprocessor, whether allocation of a task segment to the processing core is required according to the synchronization signal, wherein the task segment is a part of a task; in response to the allocation of the task segment to the processing core being required, instructing, by the microprocessor, to allocate the task segment to the processing core; receiving, by the processing core, the task segment; and in response to satisfying a first preset condition, sending, by the processing core, a synchronization request signal, wherein the synchronization request signal is configured to trigger the generation of the synchronization signal. With the above method, the microprocessor in the chip allocates the task segments executed by the processing cores according to the synchronization signal, at least partially alleviating the technical problems of inflexible task allocation and complex control of the processing cores.

The above description is only an overview of the technical solutions of the present disclosure. For a clearer understanding of the technical means of the present disclosure for implementation according to the content of the specification, and to make the above and other objectives, features, and advantages of the present disclosure clearer and more comprehensible, detailed description is provided as follows with reference to embodiments and the accompanying drawings.

BRIEF DESCRIPTION OF THE DRAWINGS

The above and other features, advantages, and aspects of embodiments of the present disclosure will become more apparent in conjunction with the accompanying drawings and with reference to the following specific embodiments. Throughout the accompanying drawings, the same or similar reference numerals represent the same or similar elements. It should be understood that the accompanying drawings are schematic and that the originals and elements are not necessarily drawn to scale.

DETAILED DESCRIPTION

Embodiments of the present disclosure will be described in greater detail below with reference to the accompanying drawings. While some embodiments of the present disclosure are shown in the accompanying drawings, it should be understood that the present disclosure may be implemented in various forms and should not be construed as being limited to the embodiments set forth herein, instead these embodiments are provided for a more thorough and complete understanding of the present disclosure. It should be understood that the accompanying drawings and embodiments of the present disclosure are for exemplary purposes only and are not intended to limit the scope of protection of the present disclosure.

It should be understood that the individual steps documented in the method embodiments of the present disclosure may be performed in a different order, and/or in parallel. In addition, the method embodiments may include additional steps and/or omit the steps illustrated. The scope of the present disclosure is not limited in this regard.

The term "include" and its variations are used herein as an open inclusion, that is, "including, but not limited to". The term "based on" means "based, at least in part, on". The term "an embodiment" means "at least one embodiment". The term "another embodiment" means "at least one additional embodiment". The term "some embodiments" means "at least some embodiments". Relevant definitions of other terms will be given in the descriptions below.

It should be noted that the concepts such as "first" and "second" mentioned in the present disclosure are used only to distinguish between different apparatuses, modules or units, and are not intended to define the order or mutual interdependence of the functions performed by these apparatuses, modules or units.

It should be noted that the modifications of "one", "a" and "plurality of" referred to in the present disclosure are illustrative rather than limiting, and it should be understood by those skilled in the art to mean "one or more" unless the context clearly indicates otherwise.

The names of messages or information exchanged between the plurality of apparatuses in the embodiments of the present disclosure are used for illustrative purposes only and are not intended to limit the scope of the messages or information.

The following two schemes are generally used to schedule tasks for processing cores.

Figure 1A:
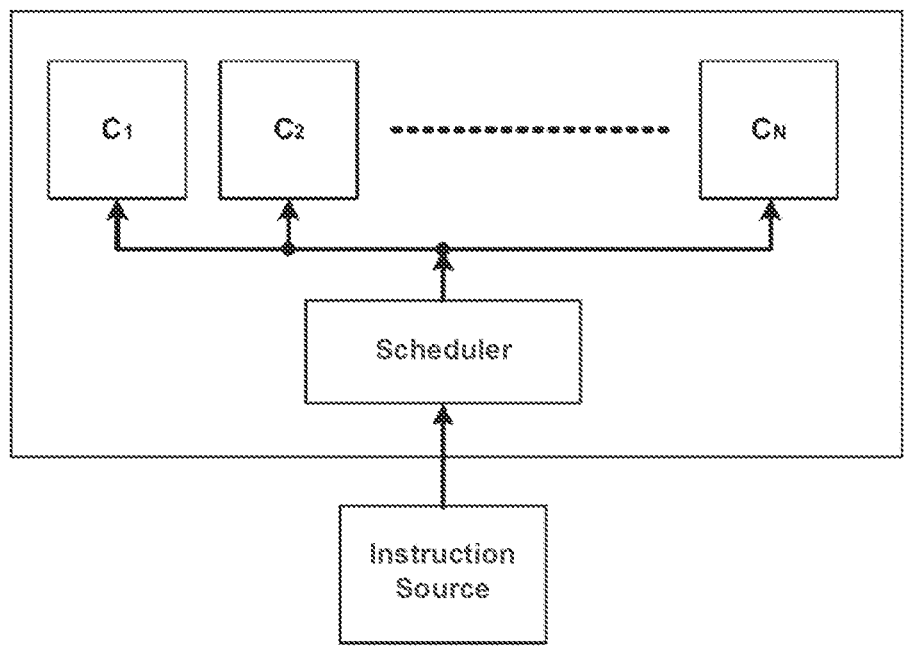
FIG. 1a-1b are schematic diagrams of the prior art of the present disclosure.

FIG. 1a illustrates a scheme for task allocation using a scheduler. In this scheme, the scheduler receives an instruction from an instruction source, and then transmits the instruction to each processing core according to a certain strategy, such as sequence; and each processing core executes the same instruction but processes different data. Each processing core may have a relatively simple structure, such as Single Instruction Multiple Data (SIMD) structure that shares control circuits and registers, or may have a relatively complex structure with a certain degree of autonomy, such as Single Instruction Multiple Threads (SIMT) structure with an independent control circuit and registers. However, in this scheme, the scheduler can only passively receive instructions from the external instruction source, and then assign the instructions to each processing core, which has a single functionality and lacks flexibility; whether it is a SIMD structure or SIMT structure, each processing core can only execute the same instructions, with little degree of freedom for each processing core and simple control.

Figure 1B:
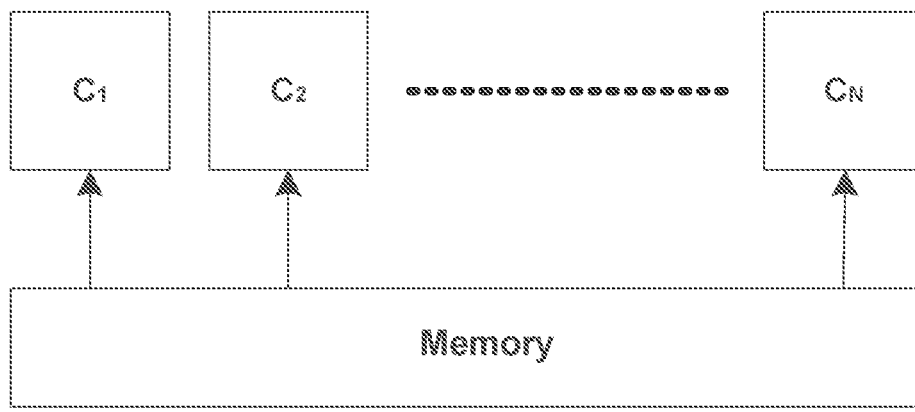

FIG. 1B illustrates a scheme where the processing cores execute tasks independently. In this scheme, each processing core can independently read instructions from the memory and perform computations; and each processing core has a complete control circuit, register group and other circuits. For the scheme, it is difficult for the processing cores to cooperate with each other to accomplish a complete task efficiently. The circuit control is complex, each core is almost a complete CPU, the design is difficult, and the power consumption and chip area are large. Multiple processing cores may frequently access the instruction storage area, resulting in a decrease in storage access efficiency, which in turn affects the utilization of the chip's computing power.

Figure 2:
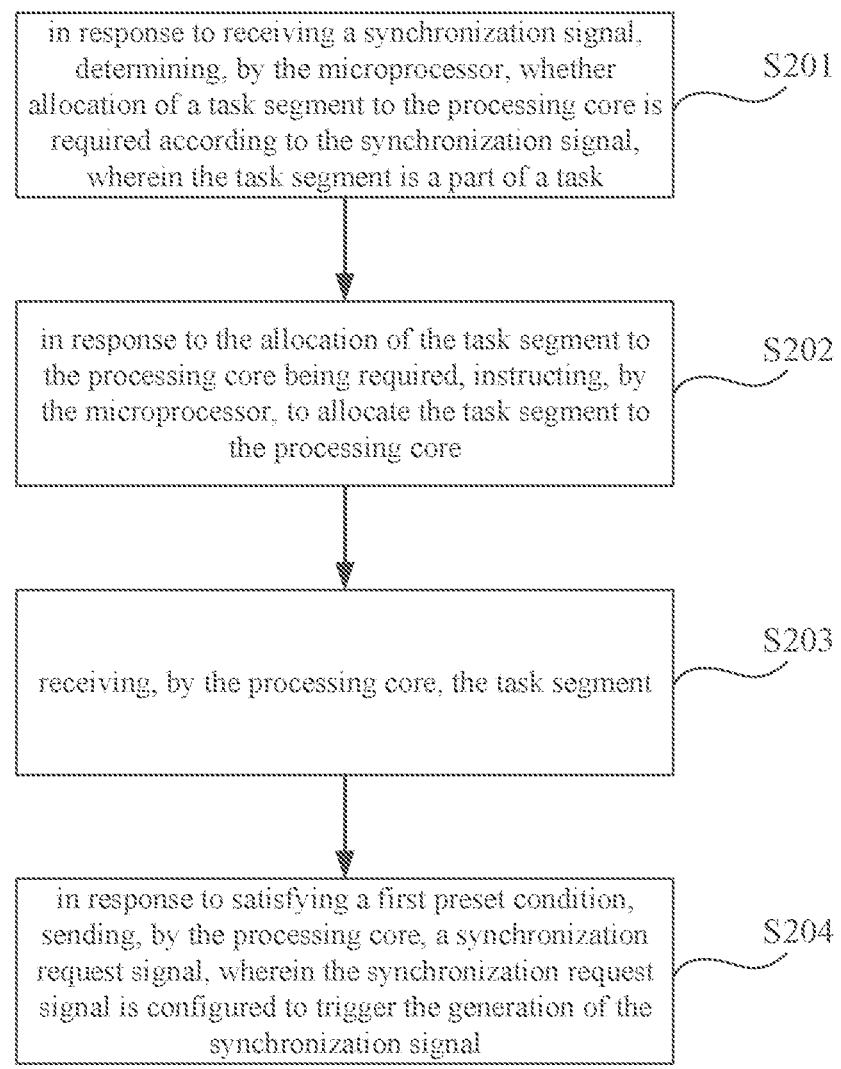
FIG. 2 is a schematic flowchart of an embodiment of a task allocation method provided by the present disclosure.

FIG. 2 is a flowchart of an embodiment of a task allocation method provided by the present disclosure. The task allocation method provided by the embodiment is used in a chip, where the chip includes a processing core and a microprocessor. As shown in FIG. 2, the method includes the following steps:

Step S201, in response to receiving a synchronization signal, determining, by the microprocessor, whether allocation of a task segment to the processing core is required according to the synchronization signal, wherein the task segment is a part of a task.

In the embodiment, in addition to executing its own program to complete normal functions, the microprocessor is also used to allocate a task segment to the processing core of the chip, where the task segment is a part of a complete task, and the complete task is divided into a plurality of task segments in advance or dynamically to facilitate its storage and execution by the processing core. When the microprocessor receives the synchronization signal, it determines whether allocation of a task segment to the processing core is required in the chip according to the received synchronization signal.

Optionally, the step S201 includes: executing, by the microprocessor, its own program; and in response to receiving the synchronization signal, determining, by the microprocessor, the processing core that requires to be allocated the task segment according to the number of the synchronization signals received. In the embodiment, a preloaded allocation strategy is stored in the microprocessor, and it is preset in the allocation strategy that, in a certain synchronization cycle, which processing core or cores need to update the task segment(s) it or they execute. The microprocessor counts the synchronization signals each time it receives the synchronization signal, and determines whether a task segment needs to be allocated to the processing core according to the counting result.

In an embodiment, the microprocessor includes a counter, and after receiving the synchronization signal, the method further includes: starting the counter to record the number of the synchronization signals received by the microprocessor. After that, the microprocessor may determine the processing core that requires to be allocated the task segment according to the number of the synchronization signals.

Step S202, in response to the allocation of the task segment to the processing core being required, instructing, by the microprocessor, to allocate the task segment to the processing core.

Optionally, when determining that a task segment needs to be allocated to the processing core, the microprocessor instructs the memory controller to read the task segment from an external memory and send it to the processing core.

Most of the time, the microprocessor executes its own program to complete other tasks such as computation, and the microprocessor stores a task segment allocation instruction. The task segment allocation instruction can be a general allocation instruction, and during execution, the microprocessor obtains the parameters of the instruction, such as the processing core to be assigned the task as indicated by the task segment allocation instruction, the storage location of the task segment to be assigned in the external memory, etc.

Exemplarily, the memory controller is a DMAC (Direct Memory Access Controller, DMA controller). The microprocessor executes the task segment allocation instruction, and configures the DMAC according to the parameters of the task segment allocation instruction, so that the DMAC directly reads the task segment to be assigned as indicated by the task segment allocation instruction from the external memory and sent it to the corresponding processing core without the involvement of the microprocessor.

Exemplarily, each time the synchronization signal is received, the microprocessor determines, according to the number of synchronization signals, the processing core to be assigned the task, that is, the processing core for which the task segment needs to be updated, and also determines the parameters such as the storage location of the task segment to be updated. The microprocessor interrupts its own program currently executed and calls the task segment allocation instruction, and configures the task segment allocation instruction using the above parameters.

Optionally, the complete task may be pre-divided into a plurality of task segments, that is, the size of each task segment and the head address of each task segment in the memory are obtained in advance. When the task segment allocation instruction is executed, the task segment can be obtained from the external memory according to the size and head address of the task segment.

Optionally, the complete task may be dynamically divided into a plurality of task segments, that is, the quantity and size of the task segments are not determined before allocation. At this time, the microprocessor instructs the memory controller to read the task segment from the external memory and send it to the processing core, including: the microprocessor obtains the size of the storage space of the processing core; and instructs the memory controller to read the task segment that matches the size of the storage space of the processing core from the memory and send it to the processing core. Each processing core has its own storage space, and the available size of the storage space may be different. Therefore, when the microprocessor instructs to allocate a task segment to the processing core, the microprocessor first obtains the size of the storage space of the processing core, and determines the size of the task segment using the size of the storage space. Then, the microprocessor determines the range of the task segment sent to the processing core in the entire task through the head address and the size of the task segment. Once the current task segment is determined, the head address of the next task segment is determined, which is used for the allocation of the next task segment. Optionally, the dynamic allocation can be dynamic allocation each time, that is, the size of the storage space of the processing core is obtained each time the task segment allocation instruction is executed; or the dynamic allocation may be dynamic allocation only for the first time, that is, the size of the storage space of the processing core is considered to be fixed when the task is executed. When the task segment is allocated for the first time, the complete task is divided into a plurality of task segments according to the size of the storage space of the processing core and the size of the complete task; and each time thereafter, the processing core is allocated the task segment according to the size of the task segments divided at the first time.

Step S203, receiving, by the processing core, the task segment.

Exemplarily, in the step, the processing core receives the task segment sent by the memory controller.

Optionally, in the step, the processing core starts to receive the task segment when receiving the synchronization signal in step S201, and at this time, while the synchronization signal is sent to the microprocessor, it is also sent to the processing core to instruct the processing core to be ready to receive the task segment.

Optionally, in the step, the processing core may not receive the synchronization signal. In this case, the reception of the task segment may be instructed in other ways, such as prompting the processing core to receive the task segment by sending a signal from the memory controller, etc., which will not be elaborated here.

Step S204, in response to satisfying a first preset condition, sending, by the processing core, a synchronization request signal, wherein the synchronization request signal is configured to trigger the generation of the synchronization signal.

When executing the task segment, the processing core sends a synchronization request signal during the execution of the task segment and/or when the execution of the task segment ends, where the synchronization request signal is used to trigger the generation of the synchronization signal.

The first preset condition includes: the processing core has received the task segment or the executing time taken by the processing core to receive the task segment reaches a preset time threshold.

In an implementation of the embodiment, when the processing core finishes receiving the task segment, the processing core calls a synchronization request signal sending instruction, indicating that a new synchronization signal can be generated to instruct the microprocessor to execute the task segment allocation for the next synchronization cycle.

In another implementation of the embodiment, the processing core may take a long time to receive the task segment and cannot finish receiving it in one synchronization cycle. Therefore, in the implementation, a timer is started at the beginning of receiving the task, and the timeout period of the timer is a preset time threshold. When the timer times out, it indicates that the time for receiving the task segment has exceeded the time threshold. At this time, the processing core calls the synchronization request signal sending instruction to send the synchronization request signal, and resets the timer.

It should be understood that the synchronization signal can be generated by the synchronization signal generator in the chip. In this case, the synchronization signal generator is a special component, which triggers the generation of the first synchronization signal at startup, and then triggers the generation of the synchronization signal after receiving the synchronization request signals sent by all processing cores.

Optionally, the synchronization signal generator may be a program unit. In this case, the synchronization signal is generated under the control of the program unit. A program is required to generate the first synchronization signal after startup, and then to trigger the generation of the synchronization signal after receiving message packets of the synchronization request signals sent by all processing cores.

After step S204, when the microprocessor receives the synchronization signal, it calls the task segment allocation instruction, and adds to the task segment allocation instruction the parameters of the next task segment including the processing core, the address or size of the task segment, etc. The task segment allocation instruction is used to instruct to send the next task segment to the processing core determined according to the synchronization signal. The parameters of the next task segment in the task segment allocation instruction are determined by an allocation strategy preset in the microprocessor.

In an embodiment, the above task allocation method further includes:
  in response to the allocation of the task segment to the processing core not being required, executing, by the microprocessor, its own program;
  executing, by the processing core, a last received task segment; and
  in response to satisfying a second preset condition, sending, by the processing core, the synchronization request signal.

In the embodiment, when it is determined in step S201 that it is not required to allocate the task segment to the processing core, the microprocessor executes its own program; at this time, the processing core continues to execute the task segment that has not been completed before, that is, to execute the last received task segment.

The second preset condition is: the processing core executes a synchronization request signal sending instruction in the last received task segment, or the time taken by the processing core to execute the last received task segment reaches a preset time threshold.

Optionally, in an implementation of this embodiment, at least one synchronization request signal sending instruction is pre-inserted into the task segment. For the synchronization request signal sending instruction set in the middle of the task segment, when the processing core executes the synchronization request signal sending instruction, the processing core sends the synchronization request signal and continues to execute the task segment; for the synchronization request signal sending instruction set at the end of the task segment, when the processing core executes the synchronization request signal sending instruction, the processing core sends the synchronization request signal and waits to receive a new task segment.

Optionally, in an implementation of the embodiment, the synchronization request signal sending instruction is not inserted into the task segment, but a timer is started when the task segment is executed, and the timeout period of the timer is a preset time threshold. When the timer times out, it indicates that the execution time for the task segment has exceeded the time threshold. At this time, the processing core calls the synchronization request signal sending instruction to send the synchronization request signal, and resets the timer. It should be understood that the time threshold of each task segment may be the same or different, and the time threshold of each task segment may be assigned when allocating the task segment, so that the synchronization signal can be triggered more flexibly.

Optionally, in the task allocation method, the chip includes at least two processing cores executing the task, and the microprocessor instructs to allocate task segments to the at least two processing cores, respectively. For each processing core that executes the task, the steps in steps S201 to S204 above may be executed between the processing core and the microprocessor, and the microprocessor can determine the processing core that requires to be allocated the task segment in the current synchronization cycle and the storage address of the task segment, etc., according to the synchronization signal.

In the embodiment, when the microprocessor receives the first synchronization signal, which does not need to be triggered by a synchronization request signal, the microprocessor calls and executes the task segment allocation instruction. The task segment allocation instruction may divide different tasks into different numbers of segments and allocate the segments to different processing cores for parallel processing. Exemplarily, there are two processing cores executing the task in the chip, and the task segment allocation instruction may divide the complete task into four segments, which are handed over to one processing core for execution sequentially. It is also possible to first divide the complete task into two parts, each part being executed by one processing core, and each part is divided into four task segments, that is to say, each processing core processes four task segments; when there is no data correlation between the task segments executed by the two processing cores, the two processing cores can process the task segments in parallel.

In this optional embodiment, the synchronization request signal includes the synchronization request signals generated by the at least two processing cores executing the task. That is, when there are a plurality of processing cores, each processing core sends its own synchronization request signal.

Further, the synchronization request signal being configured to trigger the generation of the synchronization signal, includes: in response to each of the processing cores executing the task having sent the synchronization request signal, triggering the generation of the synchronization signal. In the embodiment, the synchronization signal is generated only after each processing core executing the task has sent a synchronization request signal.

Because the task is processed in segments, the microprocessor needs to know when the task is completed in order to assign other tasks to the processing cores. In order to determine whether a task is completed, optionally, in the task allocation method, the microprocessor further includes a task counter, and the processing core corresponds to at least one task counter, wherein after the microprocessor instructs to allocate the task segments, the method further includes: starting, by the microprocessor, the task counter to record the number of the task segments that have been allocated to the processing core that executes the task; and in response to the number of the task segments that have been allocated to the processing core reaches a preset threshold, resetting the task counter. Exemplarily, a task is divided into four task segments to be executed by one processing core, and when the first task segment is allocated to the processing core, the task counter corresponding to the processing core is started, and the value of the task counter is set to 1; and thereafter, after each time a task segment is allocated to the processing core, the value of the task counter is incremented by 1 until the value of the task counter reaches 4, and the task counter is reset to indicate that the task for the processing core has been executed. When multiple processing cores complete a task together, the value of the task counter corresponding to each processing core has to reach its preset threshold to indicate the completion of the entire task. After the task counter corresponding to a certain processing core reaches its preset threshold, it indicates that the part of the task executed by the processing core is completed, and the processing core can be assigned a new task. The microprocessor determines which processing core has completed its task and needs to be allocated a new task segment according to the numbers recorded by the task counters.

Optionally, a preset number of synchronization signals may be used to determine whether the task is completed. Since in the allocation strategy, the processing cores that need to be assigned task segments and the task segments in a certain synchronization cycle are preset, it can be determined in advance that in which synchronization cycle the task ends. When the number of the synchronization signals reaches the determined synchronization cycle, it is determined that the task ends.

The above embodiments disclose a task allocation method for use in a chip, the chip including a processing core and a microprocessor, wherein the task allocation method includes: in response to receiving a synchronization signal, determining, by the microprocessor, whether allocation of a task segment to the processing core is required according to the synchronization signal, wherein the task segment is a part of a task; in response to the allocation of the task segment to the processing core being required, instructing, by the microprocessor, to allocate the task segment to the processing core; receiving, by the processing core, the task segment; and in response to satisfying a first preset condition, sending, by the processing core, a synchronization request signal, wherein the synchronization request signal is configured to trigger the generation of the synchronization signal. With the above method, the microprocessor in the chip allocates the task segments executed by the processing cores according to the synchronization signal, at least partially alleviating the technical problems of inflexible task allocation and complex control of the processing cores.

In the above paragraphs, although the steps in the abovementioned method embodiments are described in the abovementioned order, it should be clear to those skilled in the art that the steps in the embodiments of the present disclosure are not necessarily executed in the abovementioned order, and may also be performed in other order, such as in reverse order, in parallel, interleavedly or the like; and on the basis of the abovementioned steps, those skilled in the art may also add other steps. These obvious modifications or equivalent replacement modes should also be included within the protection scope of the present disclosure, and will not be elaborated here.

Figure 3:
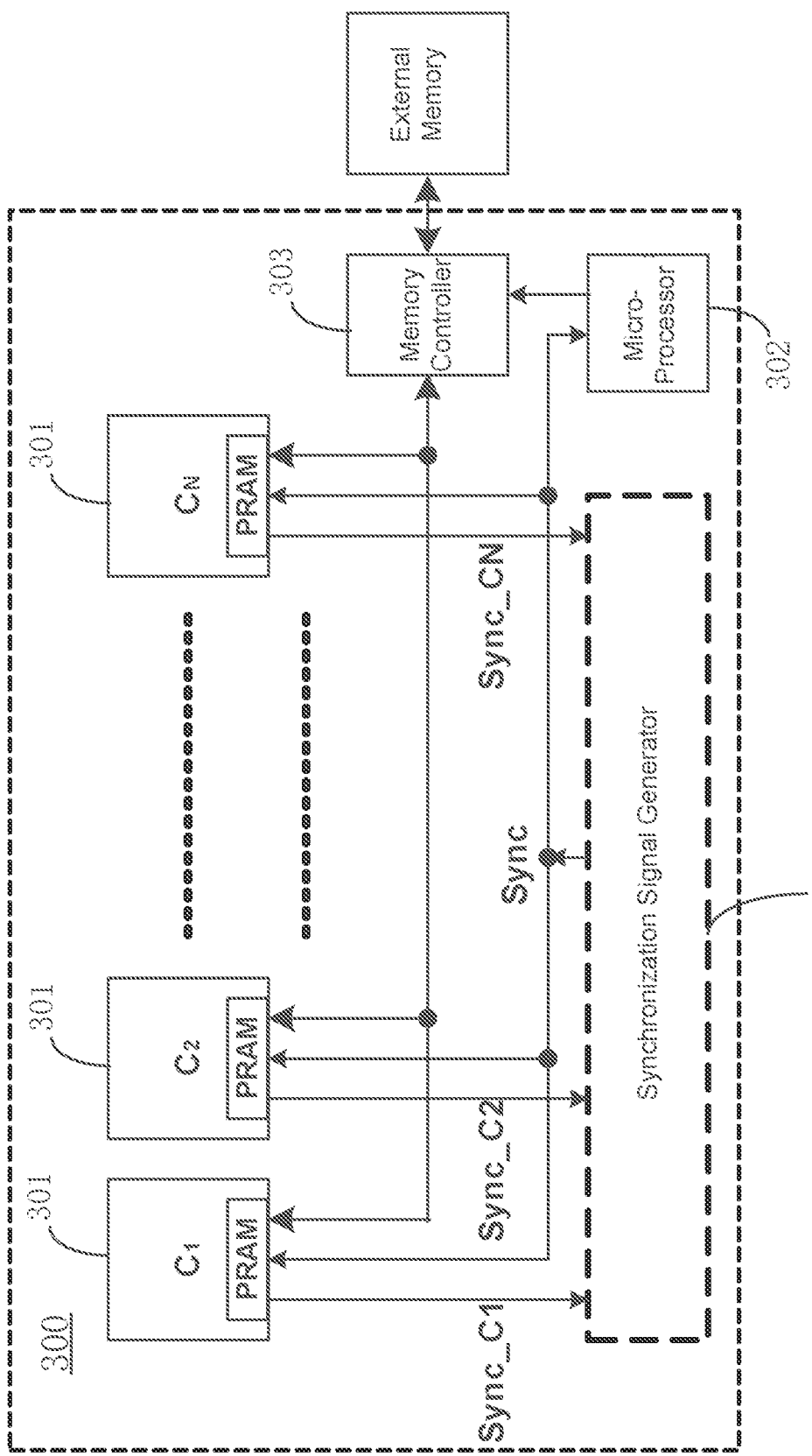
FIG. 3 is a schematic structural diagram of a chip provided by the present disclosure.

FIG. 3 is a schematic structural diagram of a chip provided by an embodiment of the present disclosure. The chip 300 as shown in FIG. 3 includes: processing cores 301, a microprocessor 302 and a memory controller 303. The processing core is configured to execute a task; the microprocessor is configured to, in response to receiving a synchronization signal, determine whether allocation of a task segment to the processing core is required according to the synchronization signal, wherein the task segment is a part of the task; and is configured to, in response to the allocation of the task segment to the processing core being required, instruct to allocate the task segment to the processing core; and the memory controller is configured to, based on an instruction from the microprocessor, read the task segment corresponding to the instruction from an external memory and send it to the processing core. The processing core further includes an internal storage space PRAM, and the internal storage space is used to store the task segment.

The chip 300 may further include a synchronization signal generator 304, which is used to generate a synchronization signal Sync, and the synchronization signal is sent to each processing core and the microprocessor.

Optionally, the synchronization signal generator is a special hardware component, which triggers the generation of the first synchronization signal at startup, and then triggers the generation of the synchronization signal after receiving the synchronization request signals sent by all processing cores.

Optionally, the synchronization signal generator is a program unit. In this case, the synchronization signal is generated under the control of the program unit. A program is required to generate the first synchronization signal after startup, and then to trigger the generation of the synchronization signal after receiving message packets of the synchronization request signals sent by all processing cores.

In an optional implementation, the synchronization signal generator may be only connected to the microprocessor, and the synchronization of the processing cores is achieved by the microprocessor instructing the DMAC, which will not be elaborated here. The following description and illustration are made with reference to the implementation shown in the drawings.

Further, the processing core is further configured to receive the task segment; and in response to satisfying a first preset condition, the processing core sends a synchronization request signal, wherein the synchronization request signal is configured to trigger the generation of the synchronization signal. The first preset condition in the embodiment is the same as that in the method embodiment, and the process of generating the synchronization signal is also the same, which will not be repeated here. As shown in FIG. 3, when the first preset condition is met, each of the processing cores sends the synchronization request signals Sync_C1, Sync_C2, . . . Sync C_N, respectively, and when the synchronization signal generator receives the synchronization request signals from all the processing cores, it generates the synchronization signal Sync, which is simultaneously sent to each processing core and the microprocessor.

Further, the microprocessor is further configured to: execute its own program; and in response to receiving the synchronization signal, determine the processing core that requires to be allocated the task segment according to the number of the synchronization signals received.

Further, the microprocessor is further configured to: in response to the allocation of the task segment to the processing core not being required, execute its own program; the processing core is further configured to: execute a last received task segment; and in response to satisfying a second preset condition, send the synchronization request signal.

Further, the second preset condition is that: the processing core executes a synchronization request signal sending instruction in the last received task segment, or the time taken by the processing core to execute the last received task segment reaches a preset time threshold.

Further, the chip includes at least two processing cores executing the task, and the microprocessor is configured to instruct to allocate task segments to the at least two processing cores, respectively.

Further, the synchronization request signal includes the synchronization request signals generated by the at least two processing cores executing the task.

Further, the microprocessor includes a counter, and after receiving the synchronization signal, the microprocessor is further configured to start the counter to record the number of the synchronization signals received by the microprocessor.

As shown in FIG. 3, the task segments executed by the processing cores are scheduled by the microprocessor 302; the microprocessor allocates tasks to each processing core according to a certain strategy, and the task allocation strategy can be set in advance, typically in an external memory or in other hosts; and during initialization, the microprocessor reads the allocation strategy externally to allocate the corresponding task segment to each processing core. Usually, the microprocessor executes its own program, and the allocation strategy of a complete task starts from the first synchronization cycle. In the first synchronization cycle, the microprocessor obtains the processing core to which the task segment needs to be assigned and the storage address of the task segment in the first synchronization cycle according to the allocation strategy, and then the microprocessor executes the task segment allocation instruction PSend, and instructs the memory controller to allocate the task segment to the corresponding processing core according to the PSend instruction. The microprocessor configures the memory controller to read the corresponding task segment from the external memory and send it to the corresponding processing core.

The processing core includes an internal storage space PRAM for storing the task segment; the task segment consists of a series of instructions. The processing core reads the instructions from the PRAM, decodes the instructions and executes the instructions, and no longer needs to read instructions from the external memory. The PRAM of each processing core has a limited storage space, so a complete task needs to be divided into a plurality of task segments for execution. During the process of executing the task segment or after the execution of the task segment, the processing core executes the synchronization request signal sending instruction to send the synchronization request signal to the synchronization signal generator.

After receiving the synchronization request signal from every processing core, the synchronization signal generator generates a new synchronization signal; and the generated synchronization signal is sent to the microprocessor and each processing core. After the microprocessor receives the synchronization signal, it determines the number of synchronization signals received, determines whether the processing core needs to be allocated a task segment according to the number of synchronization signals, and obtains the parameters required by the task allocation instruction, such as the processing core that needs to be allocated the task segment and the storage address of the corresponding task segment, according to the allocation strategy. After the parameters are acquired, the microprocessor configures the PSend instruction according to the parameters to configure the memory controller to fetch the task segment indicated by the PSend parameter from the external memory and send it to the processing core indicated by the PSend. In other times when the PSend instruction is not executed, the microprocessor may execute other processing without being idle like a dedicated scheduler, which improves the execution efficiency of the microprocessor.

Figure 4:
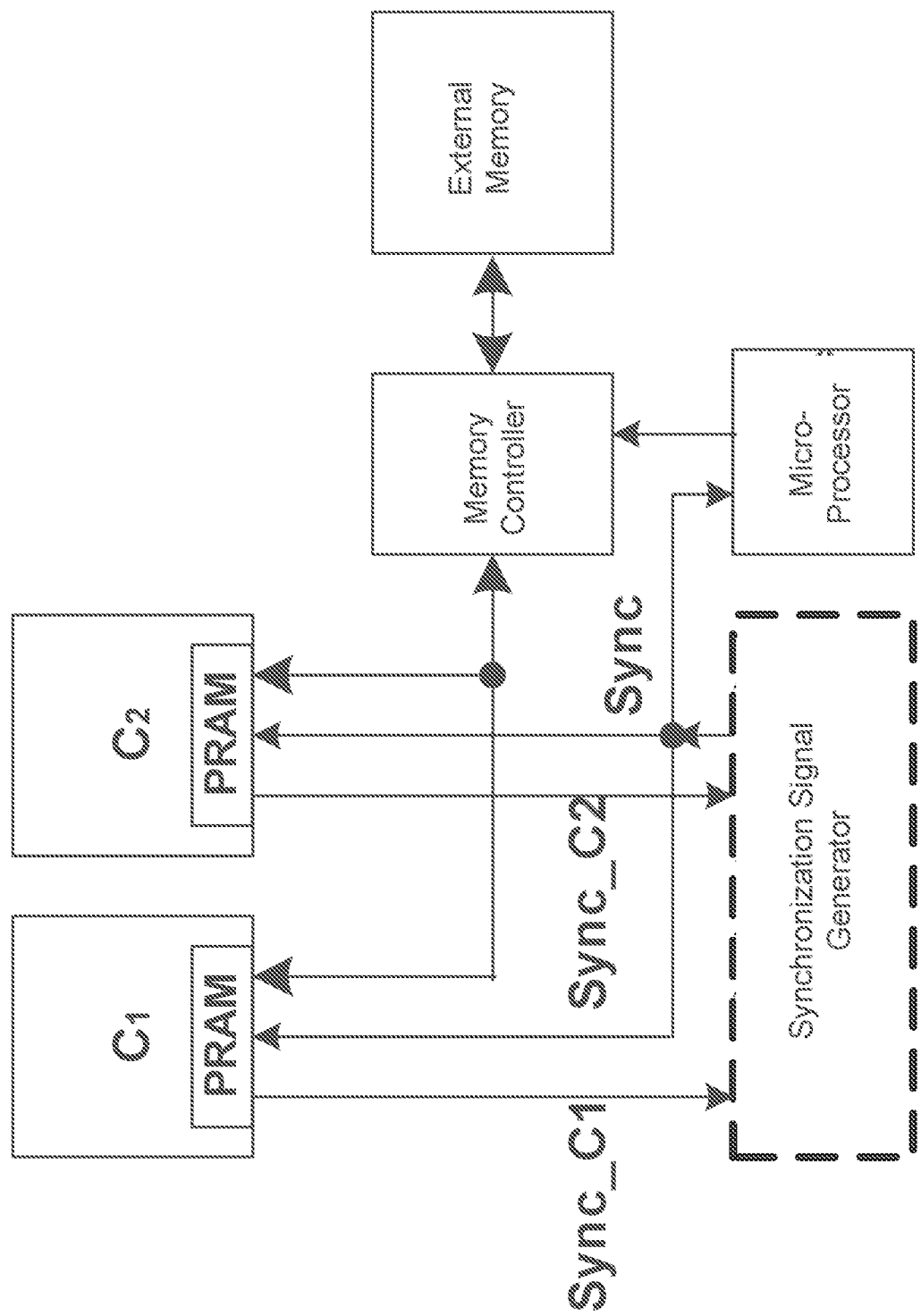
FIG. 4 is a schematic structural diagram of an embodiment of a chip provided by the present disclosure.

The following illustrates the scheduling process in the present disclosure with a practical application scenario. FIG. 4 illustrates an example of the chip according to the embodiment of the present disclosure. In the example, the chip includes two processing cores C1 and C2, a microprocessor, and a memory controller, wherein the memory controller is connected to an external memory. The chip may further include a synchronization signal generator. It should be understood that the synchronization signal generator may be implemented as hardware inside the chip or as a synchronization signal generation program, which will not be elaborated here.

Figure 5:
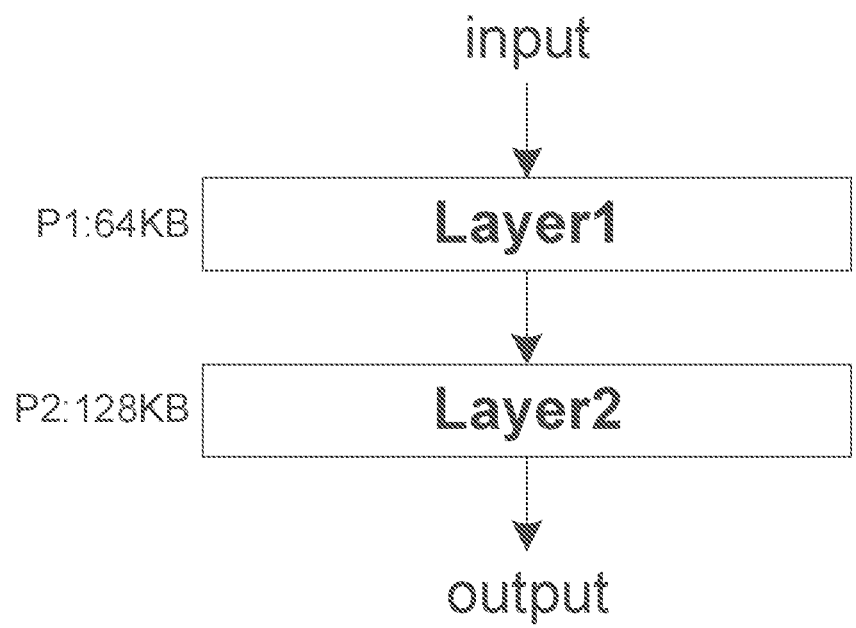
FIG. 5 is a schematic diagram of computing tasks of a neural network executed by an embodiment of a chip provided by the present disclosure.

The microprocessor is used for task scheduling, and the task is a computing task for a two-layer neural network. As shown in FIG. 5, the neural network in the example includes two layers, layer1 and layer2, where layer1 receives input data and computes, and it inputs the computation result to layer2; and layer2 performs computation on the data input from layer1 to obtain the final output. The size of the computation program P1 of the first layer is 64 KB, and the size of the computation program P2 of the second layer is 128 KB; and the entire network may be allocated to two processing cores for pipelined computation according to the task allocation strategy, that is, C1 and C2 are each responsible for the computation of a layer of the network, and each runs the program of the corresponding layer. The input data is sent to C1. C1 processes the input data according to the computation program of the first layer, and sends the processing result to C2; C2 takes the processing result of the first layer as input, performs processing according to the computation program of the second layer, and obtains the final result and then outputs.

Figure 6:
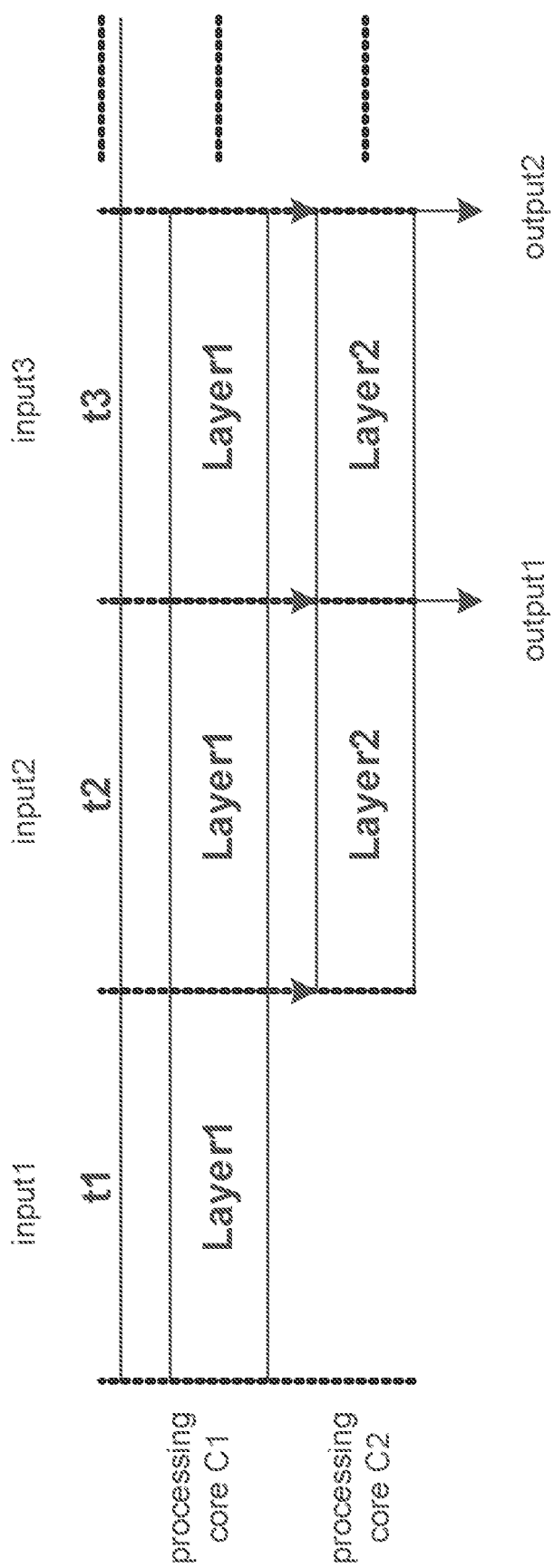
FIG. 6 is a schematic diagram of pipelined computation process of processing cores when an embodiment of a chip provided by the present disclosure executes a task allocation method.

The pipelined computation process of the network is shown in FIG. 6. At time t1, C1 receives the first input data, performs processing on the input data according to the computation program of the first layer, and outputs the processing result to C2; it should be noted that, at this time, what C1 executes is a part of the computation program, that is, the abovementioned task segment, so its output is only the partial processing result. At time t2, C1 continues to receive input data, performs processing on the input data according to the task segment it executes, and outputs the processing result to C2; at time t2, C2 performs processing on the output result of C1 at time t1, according to the output result of C1 at time t1 and the task segment executed on C2, to obtain the partial output result; and so on, until the entire task is computed, and the final output result is obtained.

In the example, the size of the PRAM of each core is 32 KB, the computation program of the first layer is 64 KB, and the computation program of the second layer is 128K. Thus, for the computation program of each layer, the program executed by the two cores needs to be allocated according to a certain strategy. Exemplarily, in the example, the computation program of the first layer is divided into 2 parts, and the computation program of the second layer is divided into 4 parts; that is, the processing core C1 processes 2 task segments, and the processing core C2 processes 4 task segments. The entire two-layer computation program is divided into 6 task segments, each with a size of 32 KB. The two processing cores are independent of each other when executing the task segments, and they are related in data. For example, C2 needs to wait for the output data of C1 as its input data, but they are independent of each other when receiving the task segments, executing the task segments and updating the task segments.

Figure 7:
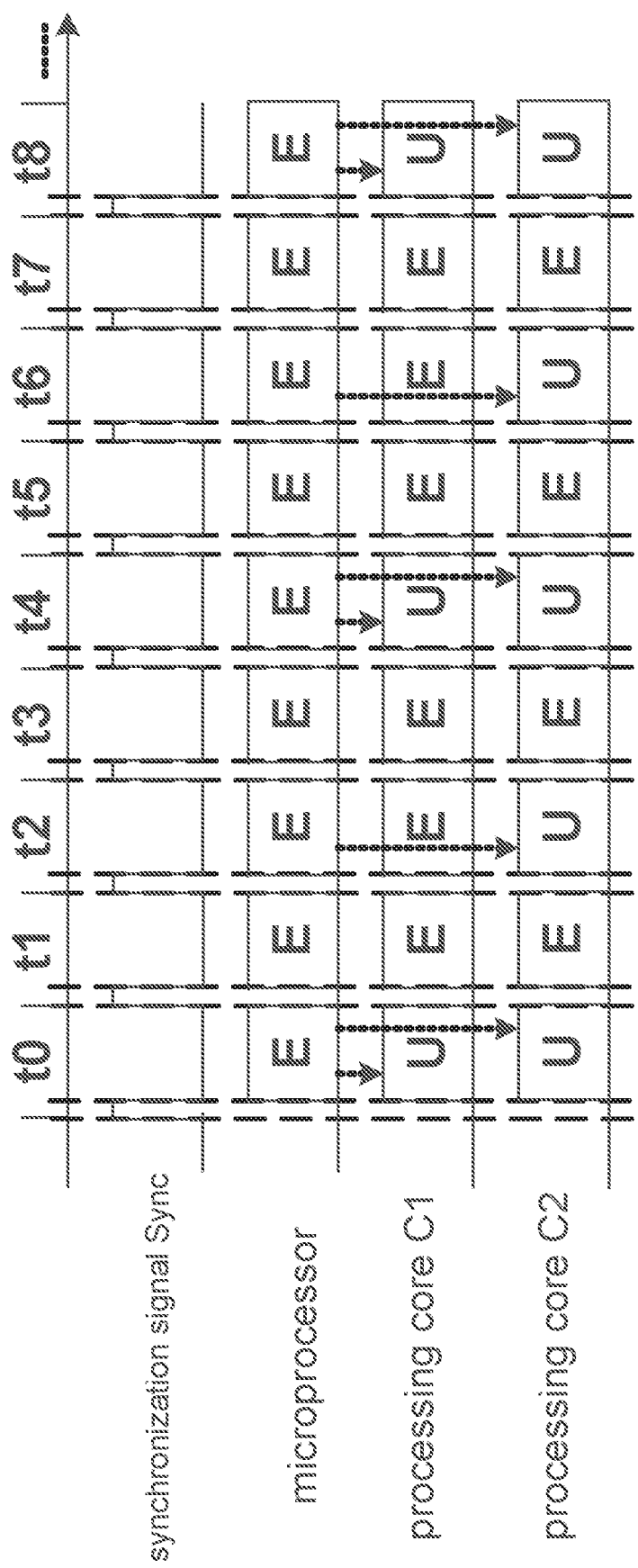
FIG. 7 is a timing diagram of a microprocessor and processing cores when an embodiment of a chip provided by the present disclosure executes a task allocation method.

FIG. 7 is a timing diagram of task allocation and execution of the processing cores. As shown in FIG. 7, initially, the synchronization signal generator generates the first synchronization signal. At this time, the microprocessor interrupts its own program, and starts the counter to prepare to count the synchronization signals Sync. According to the number of Sync and the allocation strategy, the microprocessor determines the processing cores C1 and C2 that need to be allocated task segments in the first synchronization cycle, and parameters such as the storage address of the task segment that needs to be allocated to each processing core; and the microprocessor calls the task segment allocation instruction PSend to configure the DMAC according to the abovementioned parameters. The DMAC reads the first task segments of C1 and C2 from the external memory according to the PSend instruction and writes them into the PRAM of C1 and C2, that is, in the t0 cycle in FIGS. 7, C1 and C2 are in the task segment allocation state (U), to receive the task segments. Allocating the task segments requires one synchronization cycle; when finishing receiving the task segments, C1 and C2 respectively execute the synchronization request signal sending instruction, and send the synchronization request signals to the synchronization signal generator. After receiving the synchronization request signals from both C1 and C2, the synchronization signal generator generates the synchronization signal of the synchronization cycle t1 and sent it to C1, C2 and the microprocessor. In this synchronization cycle, both C1 and C2 are in the task segment execution state (E), to execute the task segments. Due to the faster execution speed of C2, in the embodiment, C2 finishes executing the assigned task segment within the synchronization cycle of t1, and at this time, C2 executes the synchronization request signal sending instruction to generate the synchronization request signal and sent it to the synchronization signal generator; C1 has a longer execution time and has not finished execution, however, a synchronization request signal sending instruction is inserted in the task segment of C1 in advance or a synchronization request signal sending instruction is executed at a preset time threshold according to the execution time of C2, so that when C2 finishes execution, C1 also executes the synchronization request signal sending instruction to generate the synchronization request signal and sent it to the synchronization signal generator. When the synchronization signal generator receives the synchronization request signals sent by both C1 and C2, it generates the synchronization signal of the synchronization cycle t2; according to the number of synchronization signals received, the microprocessor determines that only C2 needs to be allocated a task segment in the synchronization cycle t2, and then configures the DMAC to allocate the task segment to C2 according to the allocation strategy. The steps of task segment allocation are the same as the aforementioned task segment allocation steps, and thus are not repeated here. Although C1 sends the synchronization request signal, the task segment in C1 needs to execute for three synchronization cycles. Therefore, C1 sends the synchronization request signals respectively when the cycles t1, t2 and t3 are completed. However, it does not accept new task segment in these cycles, but continues to execute the task received in the cycle to. When the microprocessor receives the synchronization request signal sent by C1 when the cycle t3 is completed, that is, when the number of the synchronization signals received by the microprocessor is 4, the microprocessor determines that the task of C1 is completed, and determines that both C1 and C2 need to be allocated task segments in the synchronization cycle t4, and then configures the DMAC to allocate task segments for C1 and C2. The steps of task segment allocation are the same as the aforementioned task segment allocation methods, and thus are not repeated here.

The allocation of the task segments of the entire task is set in the allocation strategy in advance. In the embodiment, if the microprocessor finds that the number of the current sync is a multiple of 4, it configures the DMAC to allocate corresponding task segments to C1 and C2, respectively, such as at the time t0, t4, t8, etc., in FIG. 7; the allocation of task segments to C1 and C2 is indicated by dashed arrows in the figure respectively. If the microprocessor finds that the number of the current Sync is an even number but not a multiple of 4, only C2 is allocated a task segment, such as at the time t2, t6, etc., in FIG. 7. As shown in the figure, the allocation of task segments to C2 is indicated by dashed arrows.

In the above example, in the first synchronization cycle, it is determined that the task segments need to be allocated to C1 and C2 according to the allocation strategy. It should be understood that in practical applications, it is also possible to allocate the task segment to only one processing core in the first synchronization cycle. For example, C2 needs to wait for the execution result of the first task segment of C1 as the input data of the first task segment of C2; and here, C2 can perform other tasks or wait idle in the first synchronization cycle. More generally, when a processing core needs to wait for the output result of another processing core as its input, it can perform other tasks or wait idle before obtaining the output result of the other processing core, and this is related to the preset allocation strategy.

The embodiments of the present disclosure provide an electronic device, including: a memory for storing computer-readable instructions; and one or more processors for executing the computer-readable instructions, which, upon execution, cause the processors to implement any one of the task allocation methods in the embodiments.

The embodiments of the present disclosure provide a non-transitory computer-readable storage medium, the non-transitory computer-readable storage medium storing computer instructions for causing a computer to execute any one of the task allocation methods in the embodiments.

The embodiments of the present disclosure further provide a computer program product, including computer instructions, wherein, when the computer instructions are executed by a computing device, the computing device executes any one of the task allocation methods in the embodiments.

The embodiments of the present disclosure further provide a computing apparatus, including any one of the chips in the embodiments.

The flowcharts and block diagrams in the accompanying drawings of the present disclosure show the possible architecture, functions, and operations of a system, the method, and a computer program product according to various embodiments of the present disclosure. In this regard, each block in the flowcharts or block diagrams may represent a module, a task segment or a part of codes, and the module, the task segment or the part of the codes contains one or more executable instructions for implementing the defined logical functions. It should also be noted that in some implementations as alternatives, the functions labeled in the blocks may occur in an order different from the order labeled in the accompanying drawings. For example, two sequentially shown blocks may be substantially executed in parallel in fact, and they sometimes may also be executed in a reverse order, depending on related functions. It should also be noted that each block in the block diagrams and/or the flowcharts and the combination of the blocks in the block diagrams and/or the flowcharts may be implemented by a dedicated system based on hardware for executing defined functions or operations, or may be implemented by a combination of the dedicated hardware and computer instructions.

The units described in the embodiments of the present disclosure may be implemented in a software fashion or may be implemented in a hardware fashion. The names of the units do not constitute a limitation to the units in some cases.

The functions described above herein may be performed, at least in part, by one or more hardware logic components. For example, non-restrictively, exemplary types of hardware logic components that can be used include: a field programmable gate array (FPGA), an application-specific integrated circuit (ASIC), an application-specific standard product (ASSP), a system on chip (SOC), a complex programmable logic device (CPLD), and the like.

In the context of the present disclosure, a machine-readable medium may be a tangible medium that may contain or store a program for use by or in conjunction with an instruction execution system, apparatus or device. The machine-readable medium may be a machine-readable signal medium or a machine-readable storage medium. The machine-readable medium may include, but not limited to, an electronic, magnetic, optical, electromagnetic, infrared or semiconductor system, apparatus or device, or any suitable combination of the foregoing. A more specific example of the machine-readable storage medium includes an electrical connection based on one or more wires, a portable computer disk, a hard disk, a random-access memory (RAM), a read-only memory (ROM), an erasable programmable read-only memory (an EPROM or a flash memory), an optical fiber, a portable compact disk read-only memory (CD-ROM), an optical storage device, a magnetic storage device, or any suitable combination of the above content.

The invention claimed is:

1. A task allocation method for use in a chip, the chip comprising processing cores, a microprocessor and a synchronization signal generator, wherein the method comprises:
   in response to receiving a synchronization signal, determining, by the microprocessor, whether allocation of a task segment to the processing core is required according to the synchronization signal, wherein the task segment is a part of a task, the task is a computing task executed by the microprocessor or processing cores;
   in response to the allocation of the task segment to the processing core being required, instructing, by the microprocessor, to allocate the task segment to the processing core;
   receiving, by the processing core, the task segment; and
   in response to satisfying a first preset condition, sending, by the processing core, a synchronization request signal, wherein the synchronization request signal is configured to trigger the generation of a synchronization signal, the synchronization signal is generated by the synchronization signal generator, wherein the synchronization signal generator is realized by hardware or software, wherein the first preset condition comprises the processing core has received the task segment or executing time taken by the processing core to receive the task segment reaches a preset time threshold;
   wherein in response to receiving a synchronization signal, determining, by the microprocessor, whether the allocation of the task segment to the processing core is required according to the synchronization signal, comprises:
   executing, by the microprocessor, its own program;
   in response to receiving a synchronization signal, counting, by the microprocessor, the number of synchronization signals received in a synchronization cycle; and
   determining, by the microprocessor, according to the number of synchronization signals received and a preloaded allocation strategy, the processing core that requires to be allocated the task segment, wherein the allocation strategy presets the processing core need to update the task segment that executes in the synchronization cycle;
   wherein the method further comprises:
   in response to the allocation of the task segment to the processing core not being required, executing, by the microprocessor, its own program;
   executing, by the processing core, a last received task segment that has not completed before; and
   in response to satisfying a second preset condition, sending, by the processing core, the synchronization request signal;
   wherein the second preset condition is that: the processing core executes a synchronization request signal sending instruction in the last received task segment, or time taken by the processing core to execute the last received task segment reaches a present time threshold.

2. The task allocation method according to claim 1, wherein, instructing, by the microprocessor, to allocate the task segment to the processing core, comprises:
   instructing, by the microprocessor, a memory controller to read the task segment from an external memory and send it to the processing core.

3. The task allocation method according to claim 2, wherein, instructing, by the microprocessor, the memory controller to read the task segment from the external memory and send it to the processing core, comprises:
   obtaining, by the microprocessor, size of storage space of the processing core; and
   instructing, by the microprocessor, the memory controller to read the task segment that matches the size of the storage space of the processing core from the memory and send it to the processing core.

4. The task allocation method according to claim 1, wherein the chip comprises at least two processing cores executing the task, and the microprocessor instructs to allocate task segments to the at least two processing cores, respectively.

5. The task allocation method according to claim 4, wherein the synchronization request signal comprises the synchronization request signals generated by the at least two processing cores executing the task.

6. The task allocation method according to claim 4, wherein the synchronization request signal being configured to trigger the generation of the synchronization signal, comprises:
   in response to each of the processing cores executing the task having sent the synchronization request signal, triggering the generation of the synchronization signal.

7. The task allocation method according to claim 1, wherein the microprocessor comprises a counter, and after receiving the synchronization signal, the method further comprises:

starting the counter to record the number of the synchronization signals received by the microprocessor.

8. A chip, comprising means for carrying out the method of claim 1, including:
- a processing core, configured to execute a task;
- a microprocessor, configured to, in response to receiving a synchronization signal, determine whether allocation of a task segment to the processing core is required according to the synchronization signal, wherein the task segment is a part of the task; and configured to, in response to the allocation of the task segment to the processing core being required, instruct to allocate the task segment to the processing core; and
- a memory controller, configured to, based on an instruction from the microprocessor, read the task segment corresponding to the instruction from an external memory and send it to the processing core.

9. The chip according to claim 8, wherein the chip comprises at least two processing cores executing the task, and the microprocessor is configured to instruct to allocate task segments to the at least two processing cores, respectively.

10. An electronic device, comprising: a memory for storing computer-readable instructions; and one or more processors for executing the computer-readable instructions, which, upon execution, cause the processors to implement the task allocation method according to claim 1.

* * * * *